(12) United States Patent
Ueda et al.

(10) Patent No.: US 8,006,944 B2
(45) Date of Patent: Aug. 30, 2011

(54) FIXING DEVICE

(75) Inventors: Takashi Ueda, Osaka (JP); Yoji Okuda, Osaka (JP)

(73) Assignee: Cateye Co., Ltd., Osaka (JP)

( * ) Notice: Subject to any disclaimer, the term of this patent is extended or adjusted under 35 U.S.C. 154(b) by 99 days.

(21) Appl. No.: 12/592,398

(22) Filed: Nov. 24, 2009

(65) Prior Publication Data
US 2010/0132167 A1 Jun. 3, 2010

(30) Foreign Application Priority Data
Nov. 28, 2008 (JP) .................................. 2008-303336

(51) Int. Cl.
*F16L 3/08* (2006.01)

(52) U.S. Cl. ............... 248/74.3; 248/214; 248/219.4; 248/229.17; 248/227.4; 248/230.8

(58) Field of Classification Search ............... 248/476, 248/477, 479, 49, 74.3, 214, 218.4, 219.4, 248/229.17, 227.4, 228.8, 230.8; 297/195.1, 297/215.13
See application file for complete search history.

(56) References Cited

U.S. PATENT DOCUMENTS

| | | | |
|---|---|---|---|
| 2,508,974 A | 5/1950 | Soditch et al. | |
| 4,439,902 A | 4/1984 | Huxtable | |
| 4,460,142 A * | 7/1984 | O'Rorke | 248/230.8 |
| 5,538,208 A * | 7/1996 | Cordes et al. | 248/69 |
| 6,507,980 B2 * | 1/2003 | Bremicker | 24/269 |
| 6,926,363 B2 | 8/2005 | Yamashita | |
| 7,062,969 B2 * | 6/2006 | Ueda | 73/493 |
| 7,077,302 B2 | 7/2006 | Chuang | |
| 7,150,073 B2 | 12/2006 | Stewart | |
| 7,392,967 B2 * | 7/2008 | Liaw et al. | 248/218.4 |
| 7,624,655 B2 * | 12/2009 | Ueda | 73/866.5 |
| 7,775,484 B2 * | 8/2010 | Gunzburger | 248/74.3 |
| 2007/0235607 A1 * | 10/2007 | Liaw et al. | 248/218.4 |
| 2008/0111668 A1 * | 5/2008 | Ueda | 340/432 |

FOREIGN PATENT DOCUMENTS

| | | |
|---|---|---|
| DE | 20 2004005928 U1 | 7/2004 |
| EP | 1 352820 A1 | 10/2003 |
| EP | 1 724506 A1 | 11/2006 |
| EP | 1 780518 A2 | 5/2007 |
| FR | 2 661459 A1 | 10/1991 |
| JP | 10490 | 4/1925 |
| JP | 25-010731 | 12/1950 |
| JP | 28-008225 | 8/1953 |
| JP | 42-016092 | 9/1967 |
| JP | 62-033981 | 2/1987 |
| JP | 3030453 | 11/1996 |
| JP | 09-030313 | 2/1997 |
| JP | 3079175 | 8/2001 |
| JP | 2003-120629 | 4/2003 |
| JP | 2006-349164 | 12/2006 |
| JP | 2007-118921 | 5/2007 |
| WO | WO 2009/064198 A2 | 5/2009 |

* cited by examiner

*Primary Examiner* — Terrell McKinnon
*Assistant Examiner* — Bradley H Duckworth
(74) *Attorney, Agent, or Firm* — Olson & Cepuritis, Ltd.

(57) ABSTRACT

A fixing device for a bicycle includes a base, a bracket member, a pin and a band. When fastening of the band is loosened, the bracket member comes to be rotatable in a direction of an arrow DR20 with respect to the base, allowing adjustment of a component angle. When fastened to the pipe by the belt, the base and the bracket member are engaged with each other and held in the engaged state, so that bracket cannot be rotated in a direction of an arrow DR20 with respect to the base.

5 Claims, 14 Drawing Sheets

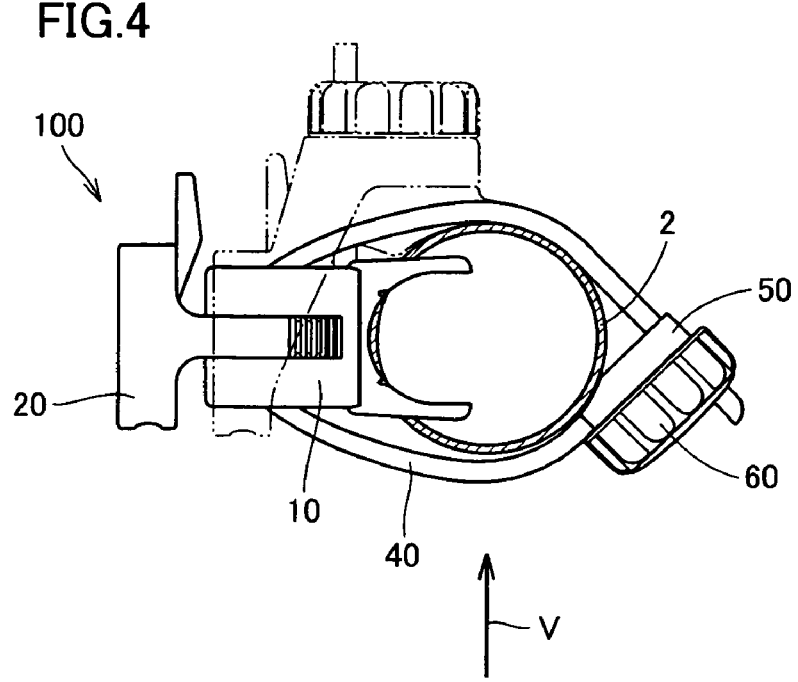
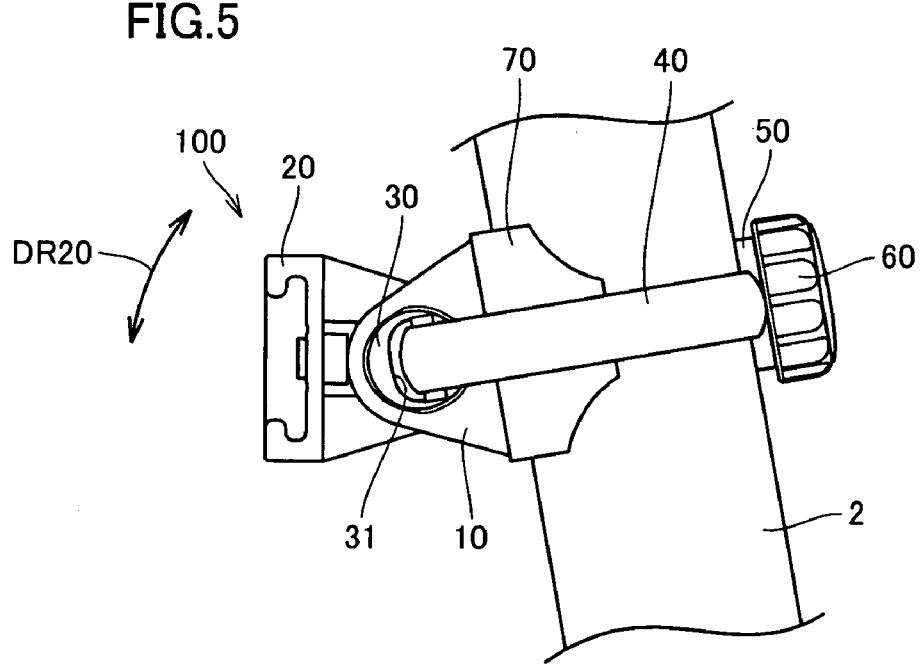

FIXING DEVICE

BACKGROUND OF THE INVENTION

1. Field of the Invention

The present invention relates to a fixing device and, more specifically, to a fixing device for fixing a prescribed component on a prescribed pipe.

2. Description of the Background Art

A fixing device for fixing a prescribed component on a prescribed pipe has been conventionally known. An example of such a fixing device is described in Japanese Patent Laying-Open No. 2006-349164 (Patent Document 1).

The fixing device described in Patent Document 1 can be fixed on a prescribed pipe of a bicycle. Here, a prescribed component is fixed on a bracket (41), and by turning a knob (43), a clamp band (42) is tightly fastened around a handle bar or the like.

In the fixing device described in Patent Document 1, however, bracket (41) cannot be turned about an axis that extends orthogonal to the pipe. This may lead to a difficulty in operating the vehicle such as a bicycle, or lead to interference with other members located therearound.

SUMMARY OF THE INVENTION

An object of the present invention is to provide a fixing device for attaching a prescribed component, which prevents difficulty in operation of a vehicle such as a bicycle and prevents possible interference with any surrounding member.

The present invention provides a fixing device, including: a first member that can be fixed on a prescribed pipe; a second member on which a prescribed component is fixed; a pin connecting the first and second members; and a band for fastening the pipe.

The first member has an elongate hole formed therein, and the second member has a circular hole formed therein. The pin is inserted to the elongate hole and the circular hole. When the pin is positioned at one end of the elongate hole, the second member is engaged with the first member, and when the pin moves to the other end of the elongate hole, the engagement is released.

Further, a through hole passing through the pin in an axial direction is provided in the pin. When the component is fixed to the pipe, the band is inserted to the through hole.

In the structure described above, by positioning the pin on the one end or the other end of the elongate hole, it is possible to establish engagement of the second member by the first member or to release the engagement. If the engagement of the second member by the first member is released, the second member may be rotated with respect to the first member and, therefore, an angle of component to be attached to the second member can be adjusted. When the second member is engaged with the first member, the component can be held at a prescribed angle. Specifically, the fixing device prevents difficulty in operation of the vehicle such as a bicycle and prevents possible interference with surrounding members.

According to an embodiment, in the fixing device, the first member has a first serrated portion formed on its surface, and the second member has a second serrated portion formed on its surface. When the pin is positioned at one end of the elongate hole, the first serrated portion and the second serrated portion are engaged with each other, and when the pin moves to the other end of the elongate hole, engagement between the first serrated portion and the second serrated portion is released.

According to an embodiment, in the fixing device, each of the first serrated portion and the second serrated portion includes projections and recesses, and the projections and the recesses are formed to have arcuate outer shape.

According to an embodiment, in the fixing device, a third serrated portion for engaging the second member and the pin is formed between an inner circumferential surface of the circular hole formed in the second member and an outer circumferential surface of the pin.

According to an embodiment, the fixing device further includes a pressing member fixed on one end of the band for pressing the pipe, and a length adjusting member attached to the pressing member for adjusting length of the band wound around the pipe. After inserting the other end of the band to the through hole, by fixing the other end of the band to the pressing member, the pin moves from the other end of the elongate hole to the one end of the same hole and the pipe comes to be sandwiched between the first member and the pressing member, so that the component is fixed on the pipe.

As described above, according to the present invention, a fixing device for attaching a prescribed component is provided, which can prevent difficulty in operation of the vehicle such as a bicycle and prevent interference with surrounding members.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a state of the fixing device for a bicycle in accordance with an embodiment of the present invention, fixed on a seat post of a bicycle.

FIG. 5 corresponds to the state shown in FIG. 4, viewed from the direction of an arrow V.

DESCRIPTION OF THE PREFERRED EMBODIMENTS

Figure 1:
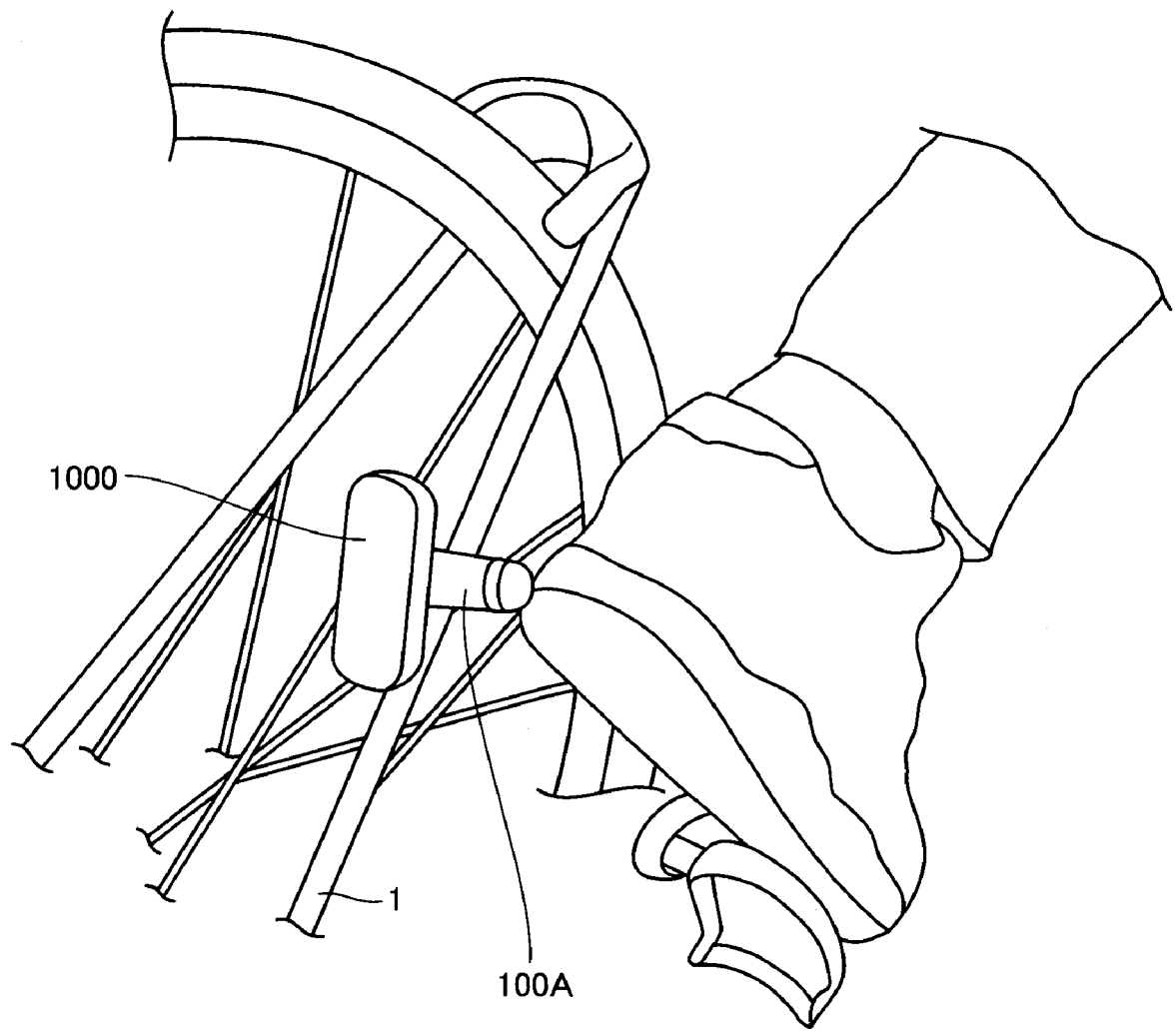
FIG. 1 shows a relation between a fixing device for a bicycle as a comparative example and a foot of a bicycle rider.

In the following, an embodiment of the present invention will be described. It is noted that the same or corresponding portions are denoted by the same reference characters, and their descriptions may not be repeated.

In the embodiments described in the following, descriptions of numbers, amounts and the like are not intended to limit the scope of the invention unless otherwise specified. Further, in the embodiments below, each component is not always necessary, unless otherwise specified.

The "fixing device" in accordance with the present invention is for fixing a prescribed component on a prescribed pipe, and the "prescribed component" and the "prescribed pipe" may be any of various and many components and pipes. In the typical example described below, the "prescribed pipe" is a bicycle frame, and the "prescribed component" may be a tail light, a reflector, a head lamp or the like to be fixed thereon. The "prescribed component" and the "prescribed pipe", however, are not limited to the above. The "prescribed pipe" may be a frame of other two-wheeled vehicles such as a motor bike, a wheel chair, a stationary bike or the like, and the "prescribed component" may be a mirror, an electronic display or the like.

In the following, a "fixing device for a bicycle" as a typical example of the "fixing device" in accordance with the present invention will be described.

FIG. 1 shows a relation between a fixing device for a bicycle as a comparative example and a foot of a bicycle rider. In addition to the above-described problem that the angle of attaching a component is limited, the fixing device of comparative example has the following problem.

In the example of FIG. 1, a fixing device 100A for a bicycle is attached to a seat stay 1, and a tail light 1000 is attached to fixing device 100A for the bicycle. Here, a part of fixing device 100A protrudes laterally from seat stay 1. As a result, fixing device 100A may hit a pedaling foot, hindering smooth ride of the bicycle.

In contrast, the fixing device for a bicycle in accordance with the present embodiment having the structure as will be described below does not hinder smooth operation of the bicycle.

Figure 2:
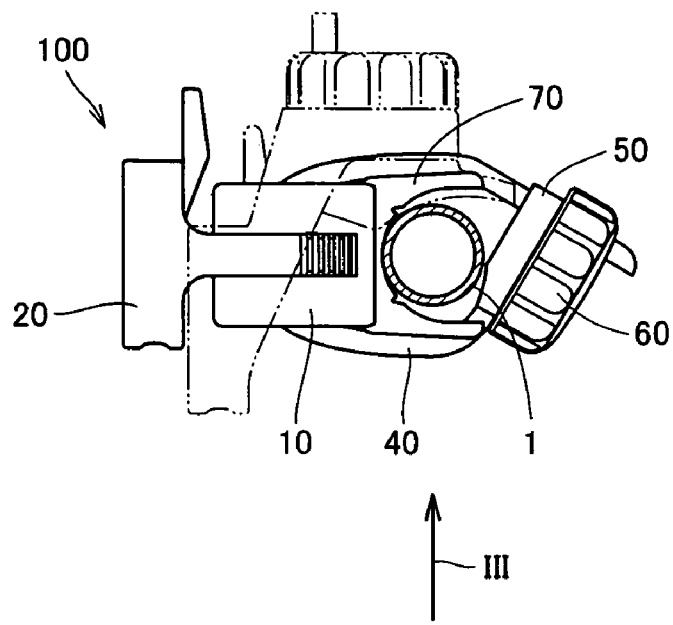
FIG. 2 shows a state of a fixing device for a bicycle in accordance with an embodiment of the present invention, fixed on a seat stay of a bicycle.
Figure 3:
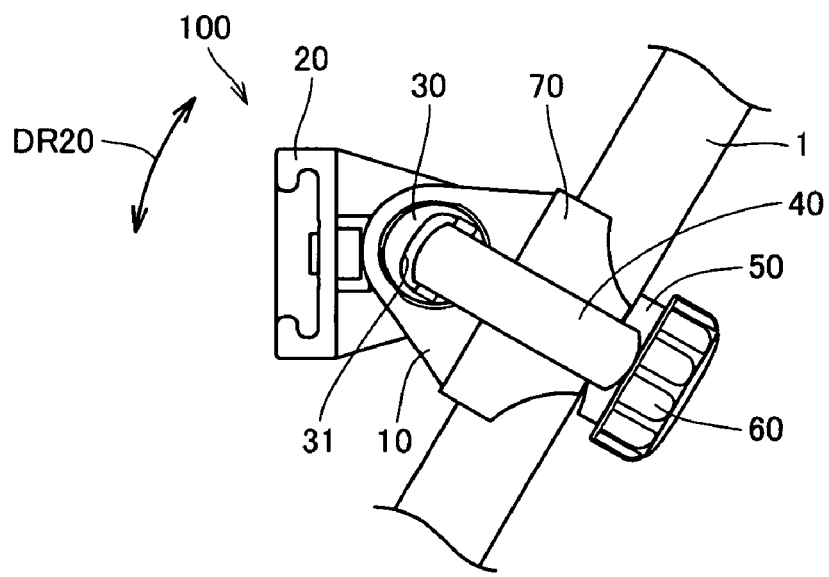
FIG. 3 corresponds to the state shown in FIG. 2, viewed from the direction of an arrow III.
Figure 6:
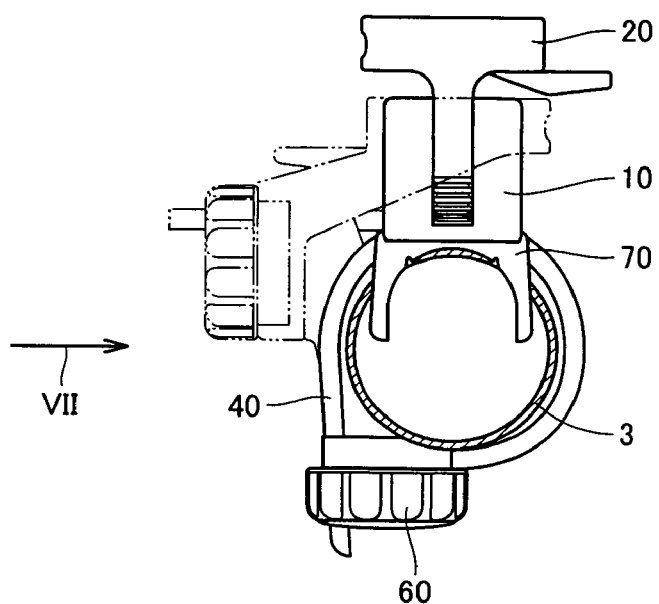
FIG. 6 shows a state of the fixing device for a bicycle in accordance with an embodiment of the present invention, fixed on a handle bar of a bicycle.
Figure 7:
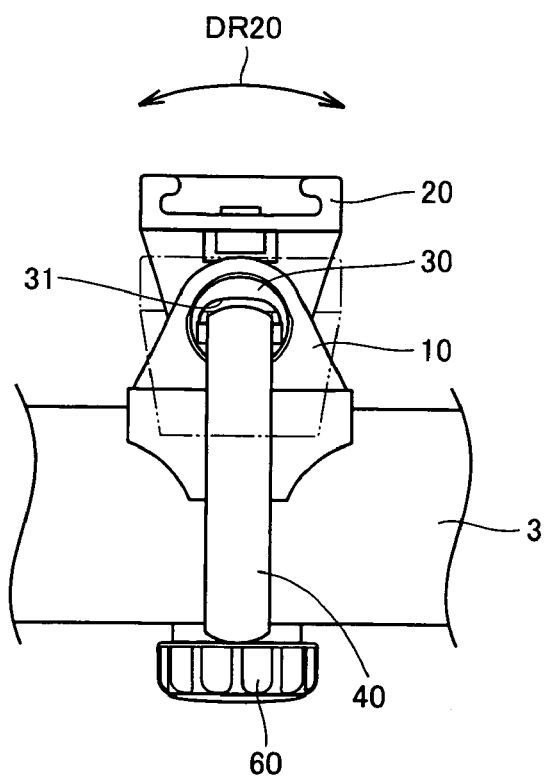
FIG. 7 corresponds to the state shown in FIG. 6, viewed from the direction of an arrow VII.

FIGS. 2, 4 and 6 show a fixing device for a bicycle in accordance with the present embodiment attached to a seat stay 1, a seat post 2, and a handle bar 3 of a bicycle, respectively. FIGS. 3, 5 and 7 correspond to the states shown in FIGS. 2, 4 and 6, viewed from the directions of arrows III (see FIG. 2), V (see FIG. 4) and VII (see FIG. 6), respectively.

Referring to FIGS. 2 to 7, fixing device 100 for a bicycle includes a base 10, a bracket member 20, a pin 30, a band 40, a pressing member 50, an adjustment knob 60 and a rubber packing 70.

Base 10 can be fixed on seat stay 1, seat post 2 and handle bar 3, for example, as shown in FIGS. 2 to 7. As shown in FIGS. 2 to 5, when fixing device 100 for a bicycle is fixed on seat stay 1 or seat post 2, a component such as a tail light or a reflector may be attached to bracket member 20. When fixing device 100 for a bicycle is fixed on handle bar 3 as shown in FIGS. 6 and 7, a component such as a head lamp may be attached to bracket member 20.

Pin 30 is a member for connecting base 10 to bracket member 20. Pin 30 is inserted to holes formed in base 10 and bracket member 20. Since pin 30 serves as a hinge, bracket member 20 can rotate in the direction of an arrow DR20 (see FIGS. 3, 5 and 7) with respect to base 10. Thus, the angle of a component fixed on the bicycle by means of fixing device 100 can be adjusted. A through hole 31 is formed in pin 30. Band 40 is inserted to through hole 31.

Band 40 is for fastening to a pipe such as seat stay 1, by which fixing device 100 for a bicycle is fixed on the bicycle. At one end of band 40, pressing member 50 is provided, integrated with band 40. Pressing member 50 is a member for pinching the pipe with base 10.

Adjustment knob 60 is rotatably attached to pressing member 50. By turning adjustment knob 60, inner diameter of a loop formed by band 40 changes, allowing attachment/detachment as well as positional adjustment of fixing device 100. In this manner, fixing device 100 for a bicycle can be attached to/detached from a pipe and its position can be adjusted, without using any tool.

Rubber packing 70 is inserted between base 10 and a pipe such as seat stay 1. Though rubber packing 70 deforms conforming to the shape of the pipe (here, seat stay 1, seat post 2 and handle bar 3) to which fixing device 100 for a bicycle is fixed, rubber packing 70 is shown not deformed, in FIGS. 2, 4 and 6.

In the fixing device as a comparative example (shown in dotted lines in FIGS. 2 to 7), the positional relation between bracket member 20 and the portion that corresponds to the adjustment knob and pressing member is fixed, and the portion corresponding to the adjustment knob and pressing member protrudes laterally from the pipe (for example, upward in FIG. 2). As a result, when the fixing device as a comparative example is mounted, it possibly has an undesirable influence on the operation of bicycle, or depending on the position, mounting of the fixing device itself is difficult in the first place.

In contrast, fixing device 100 for a bicycle in accordance with the present embodiment allows separate arrangement of bracket member 20 and pressing member 50 and, hence, it is possible to appropriately change relative position between bracket member 20 and pressing member 50.

Next, the structure of each of the components, that is, base 10, bracket 20 and pin 30 will be described in greater detail, using FIGS. 8 to 27.

Figure 8:
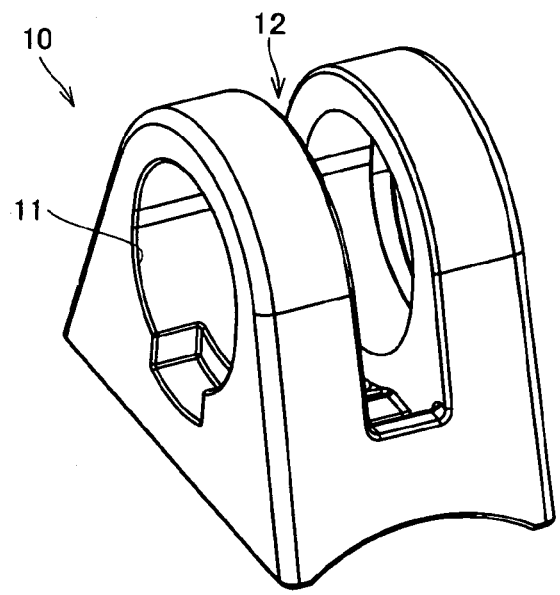
FIG. 8 is a perspective view showing a base of the fixing device for a bicycle shown in FIGS. 2 to 7.
Figure 9:
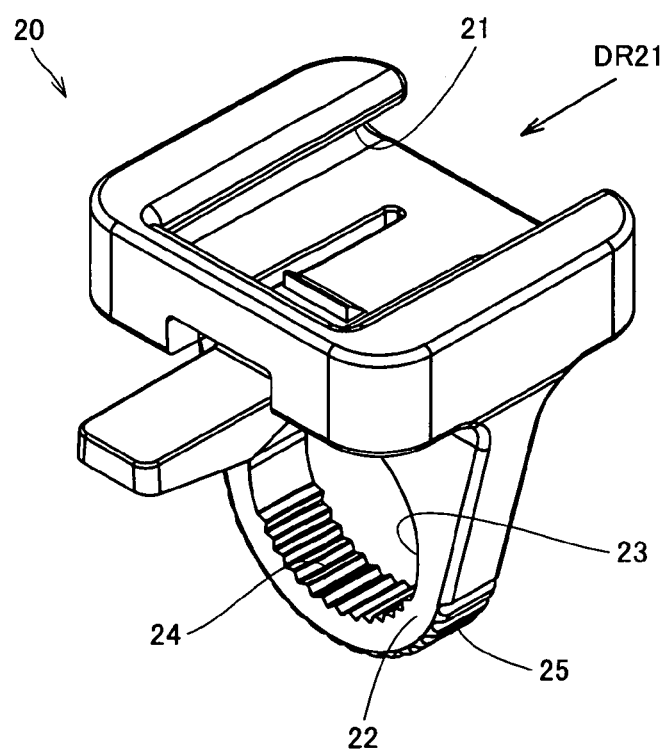
FIG. 9 is a perspective view showing a bracket member of the fixing device for a bicycle shown in FIGS. 2 to 7.
Figure 10:
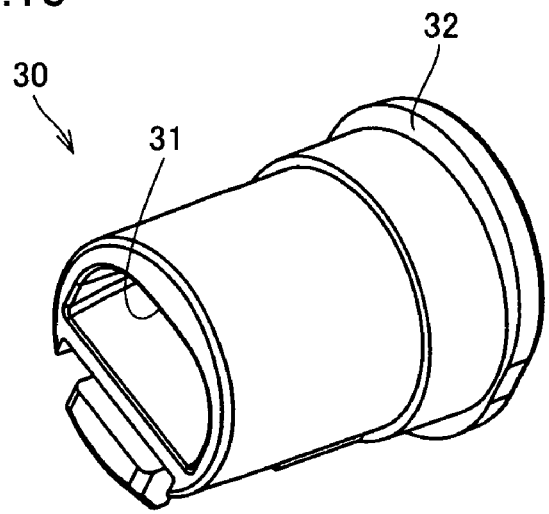
FIG. 10 is a perspective view showing a pin of the fixing device for a bicycle shown in FIGS. 2 to 7.

FIGS. 8, 9 and 10 are perspective views showing base 10, bracket 20 and pin 30, respectively, of fixing device 100 for a bicycle.

Figure 11:
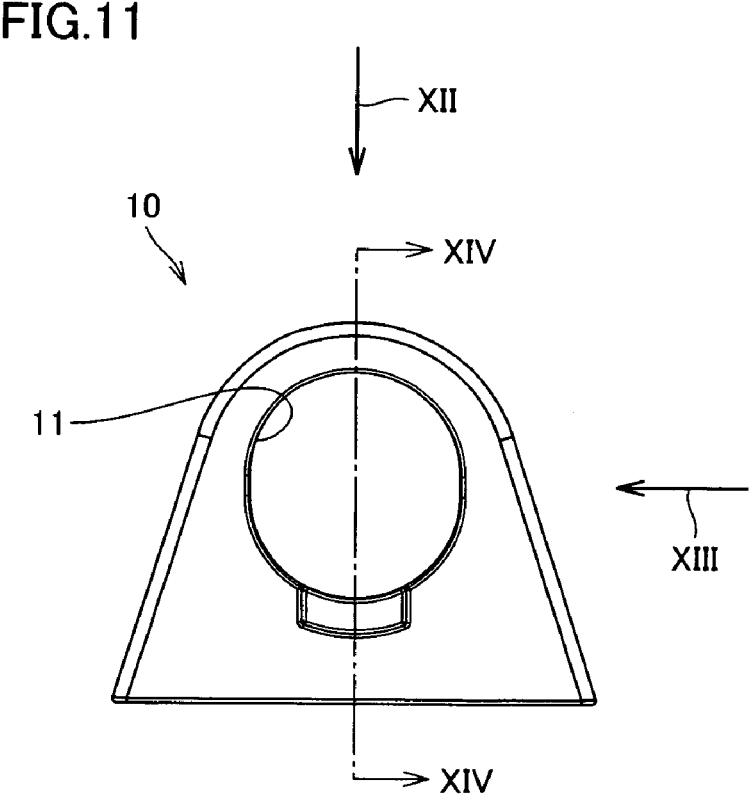
FIG. 11 is a front view of the base of the fixing device for a bicycle shown in FIGS. 2 to 7.

As shown in FIG. 8 and FIG. 11, which will be described later, base 10 has an elongate hole 11 extending in up/down direction, and a slot portion 12. Pin 30 is inserted to elongate hole 11. Further, as shown in FIG. 9, bracket 20 has an attachment portion 21 to which the "prescribed component" can be attached in a sliding manner, a fitting portion 22 protruded downward from the attachment portion, a circular hole 23 formed in fitting portion 22, a serrated portion 24 formed on an inner circumferential surface of the circular hole, and a serrated portion 25 formed on a lower surface of the fitting portion. Fitting portion 22 is fit in slot portion 12. To circular hole 23, pin 30 is inserted. Further, as shown in FIG. 10, pin 30 has a flange portion 32, which abuts base 10 and serves as a stopper when inserted to elongate hole 11 and circular hole 23.

Figure 12:
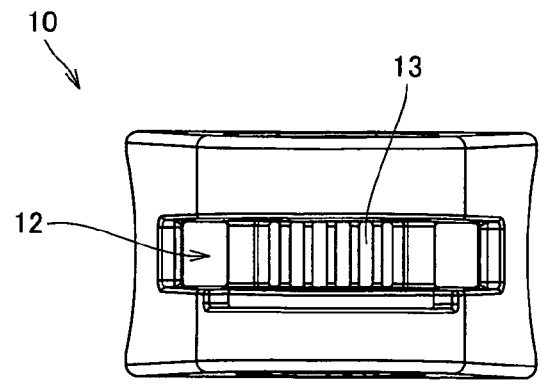
FIG. 12 corresponds to a state of the base shown in FIG. 11, viewed from the direction of an arrow XII.
Figure 13:
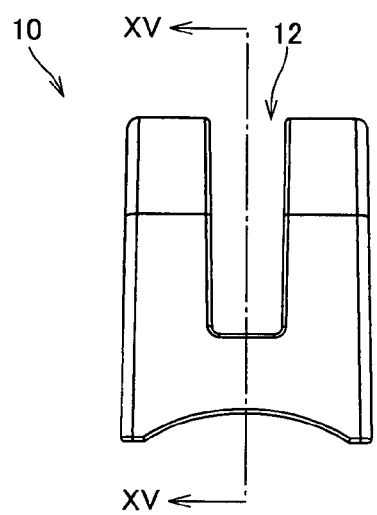
FIG. 13 corresponds to a state of the base shown in FIG. 11, viewed from the direction of an arrow XIII.
Figure 14:
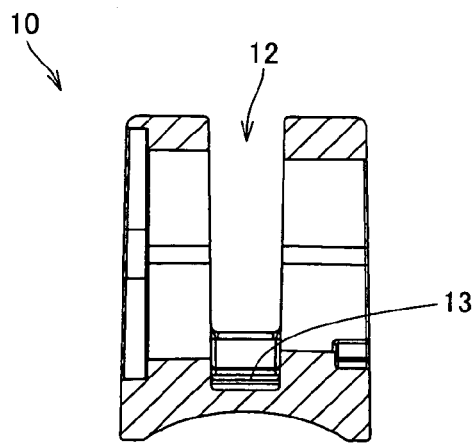
FIG. 14 is a cross-sectional view taken along the line XIV-XIV of FIG. 11.
Figure 15:
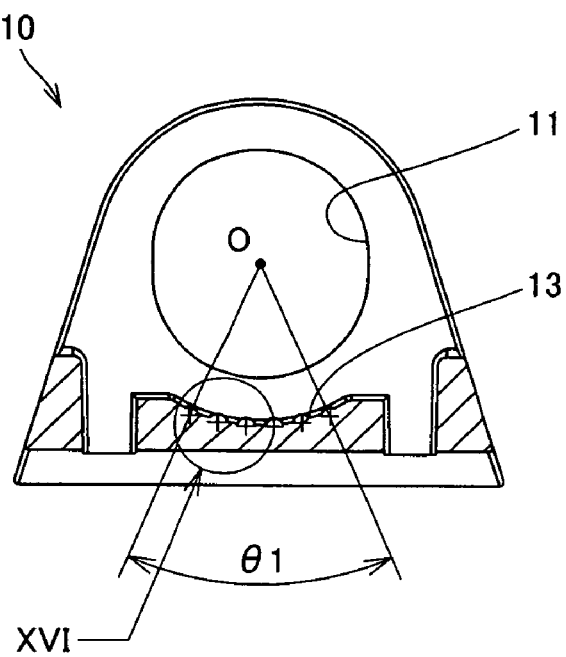
FIG. 15 is a cross-sectional view taken along the line XV-XV of FIG. 13.
Figure 16:
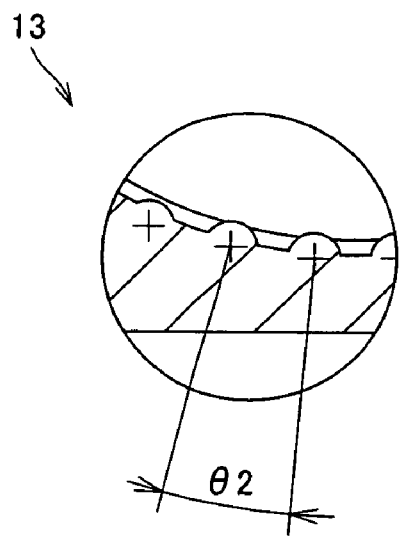
FIG. 16 is an enlarged view of a portion XVI-XVI of FIG. 15.

FIGS. 11 to 16 show, in greater detail, the structure of base 10. FIG. 12 shows a state of base 10 viewed from the direction of an arrow XII of FIG. 11, FIG. 13 shows a state of base 10 viewed from the direction of an arrow XIII of FIG. 11, FIG. 14 is a cross-section along the line XIV-XIV of FIG. 11, and FIG. 15 is a cross-section along the line XV-XV of FIG. 13. FIG. 16 is an enlarged view of a portion XVI-XVI of FIG. 15.

Referring to FIGS. 11 to 16, elongate hole 11 has a shape longer in the depth direction of slot portion 12 (up/down direction in FIG. 11). At a bottom surface of slot portion 12, a serrated portion 13 is formed. The serrated portion 13 is formed in a range of θ1 in the circumferential direction (in the present embodiment, θ1=50°) from the center (point O in FIG. 15) of pin 30 when pin 30 is positioned on the lower end of elongate hole 11. As shown in FIG. 16, projections forming the serrated portion 13 each have an arcuate outer shape. Further, a plurality of such projections are formed spaced by a constant interval of angle θ2 (in the present embodiment, θ2=10°), in the circumferential direction.

Figure 17:
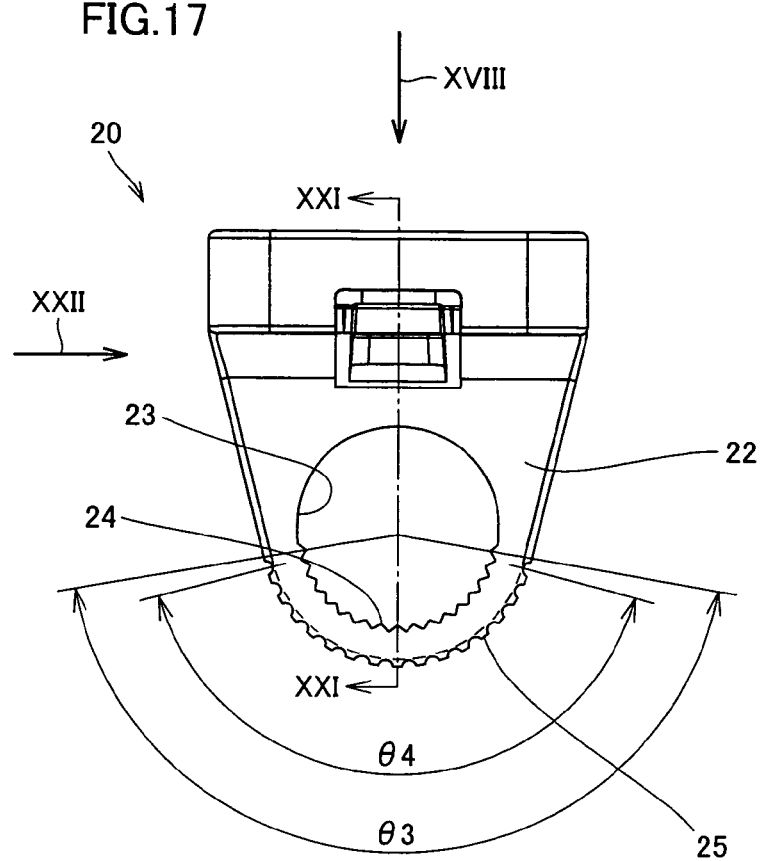
FIG. 17 is a front view of the bracket member of the fixing device for a bicycle shown in FIGS. 2 to 7.
Figure 18:
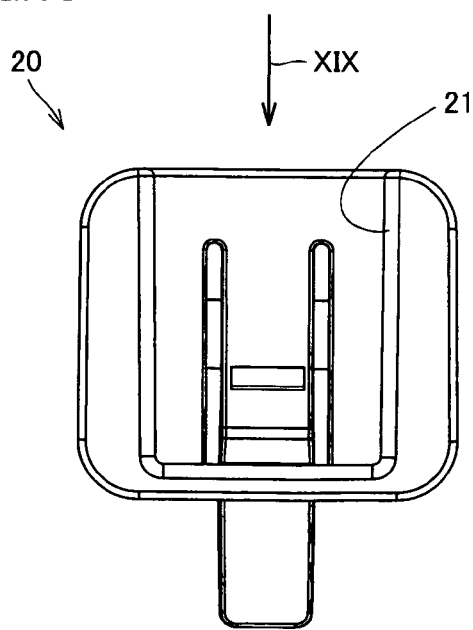
FIG. 18 corresponds to a state of the bracket member shown in FIG. 17, viewed from the direction of an arrow XVIII.
Figure 19:
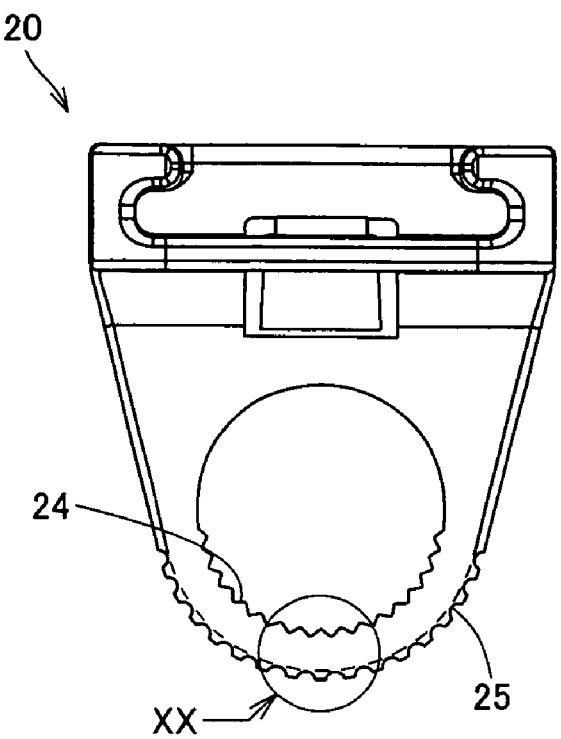
FIG. 19 corresponds to a state of the bracket member shown in FIG. 17, viewed from the direction of an arrow XIX (see FIG. 18).
Figure 20:
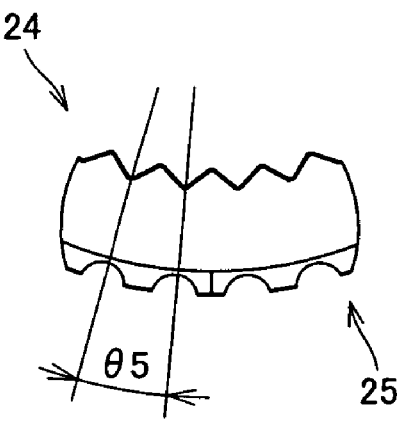
FIG. 20 is an enlarged view of a portion XX of FIG. 19.
Figure 21:
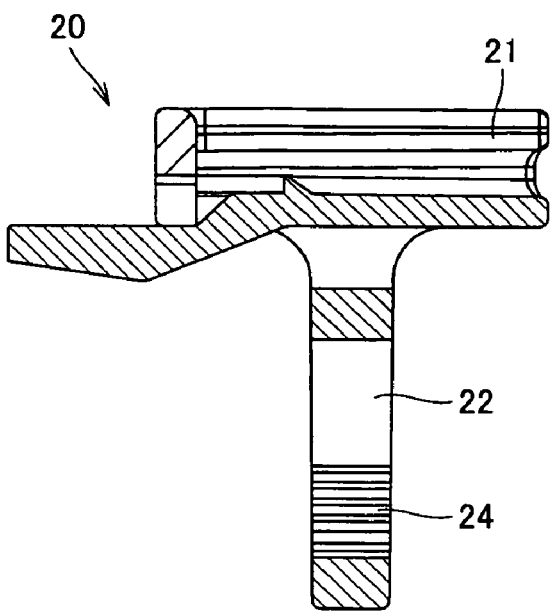
FIG. 21 is a cross-sectional view taken along the line XXI-XXI of FIG. 17.
Figure 22:
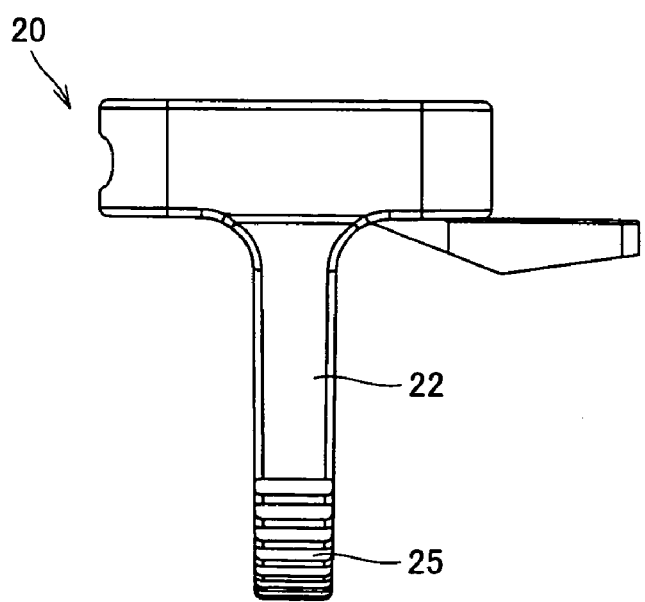
FIG. 22 corresponds to a state of the bracket member shown in FIG. 17, viewed from the direction of an arrow XXII.

FIGS. 17 to 22 show in greater detail the structure of bracket member 20. FIG. 18 shows a state of bracket member 20 viewed from the direction of an arrow XVIII of FIG. 17, FIG. 19 shows a state of bracket member 20 viewed from the direction of an arrow XIX of FIG. 18, FIG. 20 is an enlarged view of a portion XX of FIG. 19, FIG. 21 shows a cross-section along the line XXI-XXI of FIG. 17, and FIG. 22 shows a state of bracket member 20 viewed from the direction of an arrow XXII of FIG. 17.

Referring to FIGS. 17 to 22, serrated portion 24 formed on the inner circumferential surface of circular hole 23 is formed in the range of θ3 (in the present embodiment, θ3=160°) from the center, of circular hole 23, in the circumferential direction. Further, serrated portion 25 formed on the lower surface of fitting portion 22 is formed in the range of θ4 (in the present embodiment, θ4=150°) from the center of circular hole 23, in the circumferential direction. As shown in FIG. 20, a recessed portion forming the serrated portion 24 has a linear outer shape. On the other hand, a recessed portion forming serrated portion 25 has an arcuate outer shape. Further, a plurality of recessed portions forming serrated portions 24 and 25 are formed spaced by a constant interval of angle θ5 (in the present embodiment, θ5=10°), in the circumferential direction.

Figure 23:
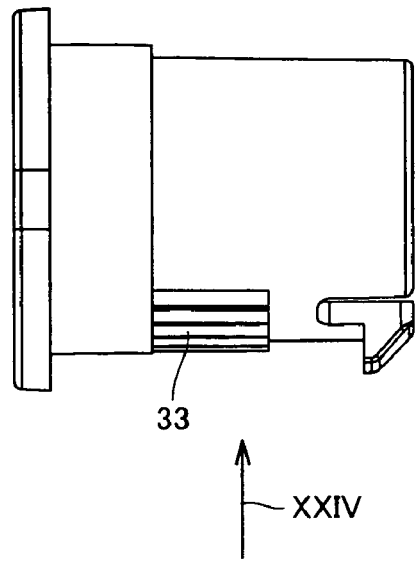
FIG. 23 is a front view of the pin of the fixing device for a bicycle shown in FIGS. 2 to 7.
Figure 24:
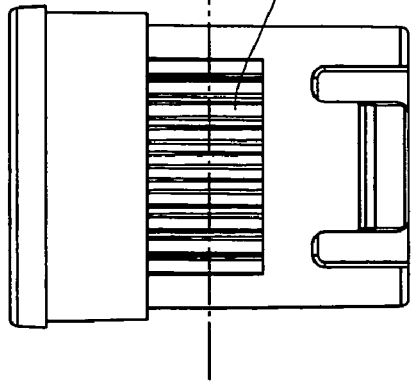
FIG. 24 corresponds to a state of the pin shown in FIG. 23, viewed from the direction of an arrow XXIV.
Figure 25:
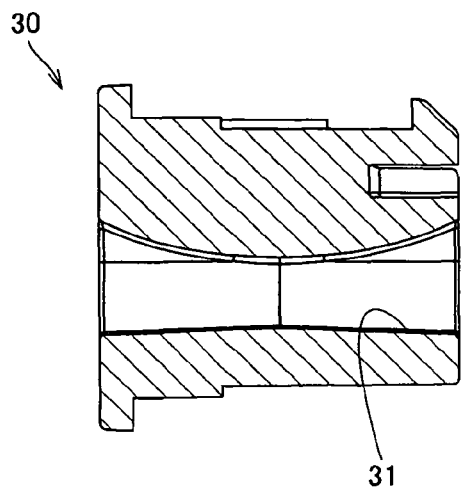
FIG. 25 is a cross-sectional view taken along the line XXV-XXV of FIG. 24.
Figure 26:
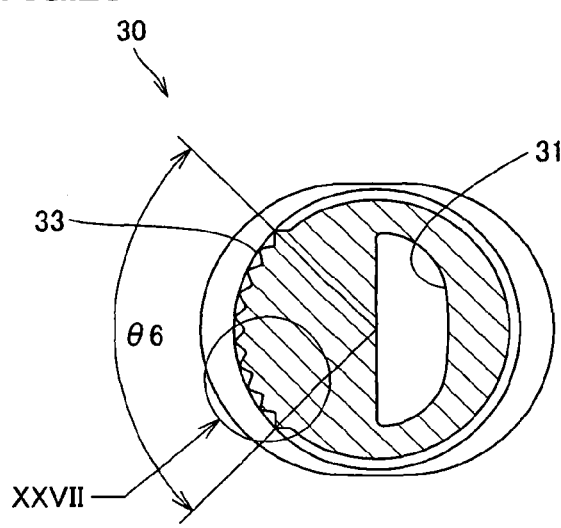
FIG. 26 is a cross-sectional view taken along the line XXVI-XXVI of FIG. 24.
Figure 27:
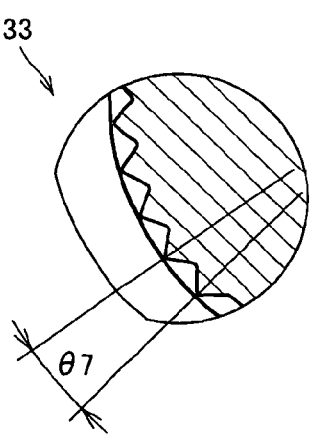
FIG. 27 is an enlarged view of a portion XXVII of FIG. 26.

FIGS. 23 to 27 show, in greater detail, the structure of pin 30. FIG. 24 shows a state of pin 30 viewed from the direction of an arrow XXIV of FIG. 23, FIG. 25 is a cross-section along the line XXV-XXV of FIG. 24, and FIG. 26 is a cross-section along the line XXVI-XXVI of FIG. 24. FIG. 27 is an enlarged view of a portion XXVII of FIG. 26.

Referring to FIGS. 23 to 27, on a lower surface of pin 30, a serrated portion 33 is formed. Serrated portion 33 is formed in the range of θ6 (in the present embodiment, θ6=90°) in the circumferential direction, viewed from the center of pin 30. Further, as shown in FIG. 27, a plurality of projections forming serrated portion 33 are formed spaced by a constant interval of angle θ7 (in the present embodiment, θ7=10°), in the circumferential direction. Further, each of the projections is formed to have a linear outer shape.

Of the serrated portions 13, 24, 25 and 33, serrated portion 13 formed on base 10 can be engaged with serrated portion 25 formed on bracket member 20, and serrated portion 24 formed on bracket member 20 can be engaged with serrated portion 33 formed on pin 30. As the serrated portions are engaged with each other, rotation of base 10, bracket member 20 and pin 30 relative to each other can be prevented.

Next, referring to FIGS. 28A to 28D, the process steps of adjusting angle of bracket member 20 with respect to base 10 will be described.

Figure 28A:
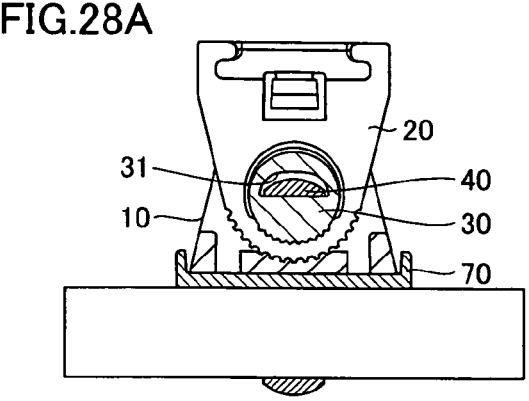
FIGS. 28A to 28D illustrate process steps of adjusting an angle of the bracket member to the base, in the fixing device for a bicycle shown in FIGS. 2 to 7.

FIG. 28A shows a state in which band 40 is fastened and bracket member 20 does not turn. In this state, pin 30 is positioned at a lower end portion (end closer to the pipe) of elongate hole 11 of base 10, base 10 (serrated portion 13) and bracket member 20 (serrated portion 25) are engaged with each other, and bracket member 20 (serrated portion 24) and pin 30 (serrated portion 33) are engaged with each other. In this manner, engagement between bracket member 20 and pin 30 is utilized in addition to the engagement between base 10 and bracket, member 20, whereby bracket member 20 can more reliably fixed, when a component is fixed. It is noted that serrated portions 24 and 33 for attaining engagement between bracket portion 20 and pin 30 are provided to increase joint strength, and they are not always necessary.

Figure 28B:
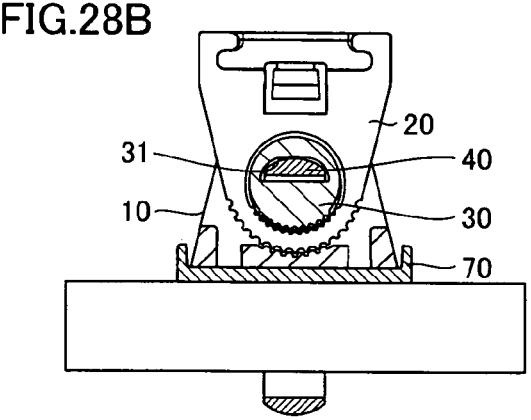
Figure 28C:
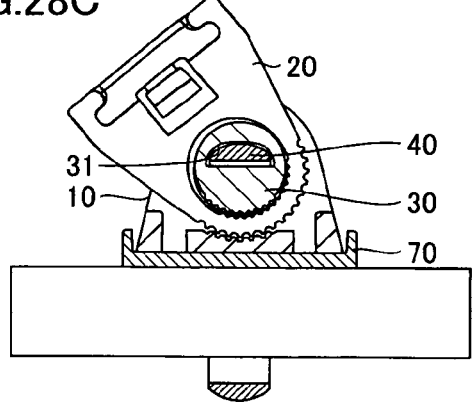

When band 40 is released from the state shown in FIG. 28A, engagement between base 10 and bracket member 20 and between bracket member 20 and pin 30 is released as shown in FIG. 28B, allowing rotation of base 10, bracket member 20 and pin 30 relative to each other. More specific description will be given below.

Longer diameter of elongate hole 11 formed in base 10 is slightly larger than the outer diameter of pin 30. Therefore, pin 30 is movable in elongate hole 11 in the longer diameter direction. As pin 30 moves relative to base 10, bracket member 20 also moves relative to base 10. In this manner, engagement between base 10 and bracket member 20 is released. In this state, pin 30 is positioned at an upper end (end far from pipe) of elongate hole 11 of base 10.

Further, the diameter of circular hole 23 formed in bracket 20 is slightly larger than the outer diameter of pin 30. Therefore, as the fastening of band is made loose, band 40 inserted through the through hole 31 of pin 30 pushes up pin 30, so that engagement between bracket member 20 and pin 30 is released.

Figure 28D:
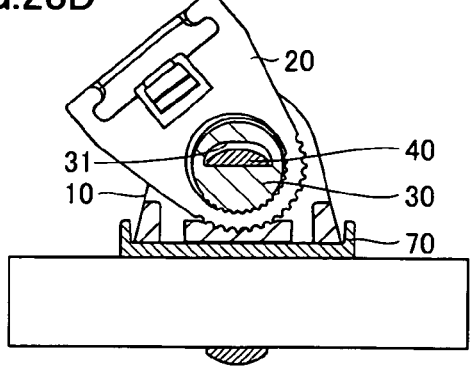

When base 10, bracket member 20 and pin 30 are set to the state allowing rotation relative to each other as described above, as shown in FIG. 28C, it becomes possible to adjust the angle of component attached to bracket member 20. The angle can be adjusted by the unit of pitch θ1 and θ5 (=10°) of serrated portions 13 and 25 formed on base 10 and bracket member 20, respectively. By forming projections and recesses forming serrated portions 13 and 25 to have arcuate outer shapes, smooth rotation for angle adjustment mentioned above becomes possible. After the angle adjustment described above, the length of band 40 inserted to through hole 3.1 is adjusted to fasten to the pipe, as shown in FIG. 28D. As a result, base 10, bracket member 20 and pin 30 are again engaged with each other, and bracket member 20 is fixed at a prescribed angle on base 10.

As described above, in the fixing device for a bicycle in accordance with the present embodiment, it is possible to selectively engage or disengage base 10 and bracket member 20, by positioning pin 30 either at an upper end side or lower end side of elongate hole 11. When engagement of bracket member 20 by base 10 is released, bracket member 20 is rotatable with respect to base 10 and, therefore, an angle of a component such as a tail light attached to bracket member 20 can be adjusted. By attaining engagement between base 10 and bracket 20 thereafter, the component can be held at a prescribed angle.

Further, by the structure described above, it is possible to freely adjust the position of pressing member 50 pinching the pipe with base 10 and the position of adjustment knob 60 attached to pressing member 50. Therefore, it is possible to prevent pressing member 50 and adjustment knob 60 from hindering smooth operation of the bicycle, or from interfering with surrounding members.

The contents described above will be summarized. Specifically, fixing device 100 for a bicycle in accordance with the present embodiment includes base 10 as a "first member" that can be fixed on a prescribed pipe (seat stay 1, seat post 2, handle bar 3 or the like) of the bicycle, bracket member 20 as a "second member" on which a prescribed component (for example, a tail light, a reflector, a head lamp or the like) is fixed, pin 30 for connecting base 10 and bracket member 20, and band 40 for fastening to the pipe mentioned above.

Elongate hole 11 is formed in base 10, and circular hole 23 is formed in bracket member 20. Pin 30 is inserted to elongate hole 11 and circular hole 23. When pin 30 is positioned at a lower end (one end) of elongate hole 11, bracket member 20 is engaged with base 10. When pin 30 moves to the upper end (the other end) of elongate hole 11, the engagement is released.

A through hole 31 passing through the pin 30 in the axial direction is formed in pin 30. When the prescribed component mentioned above is to be fixed on the pipe mentioned above, band 40 is inserted to through hole 31.

More specifically, fixing device 100 further includes pressing member 50 fixed on one end of band 40 for pressing the pipe, and adjustment knob 60 as the "length adjusting member" attached to pressing member 50 for adjusting the length of band 40 wound around the pipe. After inserting a free end (the other end) of band to through hole 31, by fixing the free end to pressing member 50, pin 30 moves from the upper end to the lower end of elongate hole 11 and the pipe comes to be sandwiched between base 10 and pressing member 50, so that the prescribed component is fixed on the pipe.

More specifically, serrated portion 13 as the "first serrated portion" is formed on the surface of base 10, and serrated portion 25 as the "second serrated portion" is formed on the surface of bracket member 20. When pin 30 is positioned at the lower end of elongate hole 11, serrated portions 13 and 25 are engaged with each other, and when pin 30 moves to the upper end of elongate hole 11, serrated portions 13 and 25 are disengaged.

The projections and recesses forming serrated portions 13 and 25 are formed to have arcuate outer shape.

Further, serrated portions 24 and 33 are formed as the "third serrated portion" for attaining engagement between bracket member 20 and pin 30, on the inner circumferential surface of circular hole 23 and the outer circumferential surface of pin 30.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A fixing device, comprising:
   a first member that can be fixed on a prescribed pipe;
   a second member on which a prescribed component is fixed;
   a pin connecting said first member and said second member; and
   a band for fastening to said pipe; wherein
   said first member has an elongate hole formed therein, and said second member has a circular hole formed therein;
   said pin is inserted to said elongate hole and said circular hole;
   when said pin is positioned at one end of said elongate hole, said second member is engaged with said first member, and when said pin moves to the other end of said elongate hole, said engagement is released;
   a through hole passing through said pin in an axial direction is provided in said pin; and
   when said component is fixed to said pipe, said band is inserted to said through hole.

2. The fixing device according to claim 1, wherein
   said first member has a first serrated portion formed on its surface;
   said second member has a second serrated portion formed on its surface;
   when said pin is positioned at one end of said elongate hole, said first serrated portion and said second serrated portion are engaged with each other; and
   when said pin moves to the other end of said elongate hole, engagement between said first serrated portion and said second serrated portion is released.

3. The fixing device according to claim 2, wherein
   each of said first serrated portion and said second serrated portion includes projections and recesses, and
   said projections and said recesses are formed to have arcuate outer shape.

4. The fixing device according to claim 1, wherein
   a third serrated portion for engaging said second member and said pin is formed between an inner circumferential surface of said circular hole formed in said second member and an outer circumferential surface of said pin.

5. The fixing device according to claim 1, further comprising:
   a pressing member fixed on one end of said band for pressing said pipe; and
   a length adjusting member attached to said pressing member for adjusting length of said band wound around said pipe; wherein
   after inserting the other end of said band to the through hole, by fixing said the other end of said band to the pressing member, said pin moves from said the other end of the elongate hole to said one end of the same hole and said pipe comes to be sandwiched between said first member and said pressing member, so that said component is fixed on said pipe.

* * * * *

UNITED STATES PATENT AND TRADEMARK OFFICE
CERTIFICATE OF CORRECTION

PATENT NO.          : 8,006,944 B2
APPLICATION NO.     : 12/592398
DATED               : August 30, 2011
INVENTOR(S)         : Takashi Ueda and Yoji Okuda It is certified that error appears in the above-identified patent and that said Letters Patent is hereby corrected as shown below:

Col. 5, line 50, delete the "," after the word "center"

Col. 6, line 30, delete the "," after the word "bracket"

Col. 6, line 66, change "through hole 3.1" to "through hole 31".

Signed and Sealed this
Twenty-ninth Day of November, 2011

David J. Kappos
*Director of the United States Patent and Trademark Office*